UNITED STATES PATENT OFFICE.

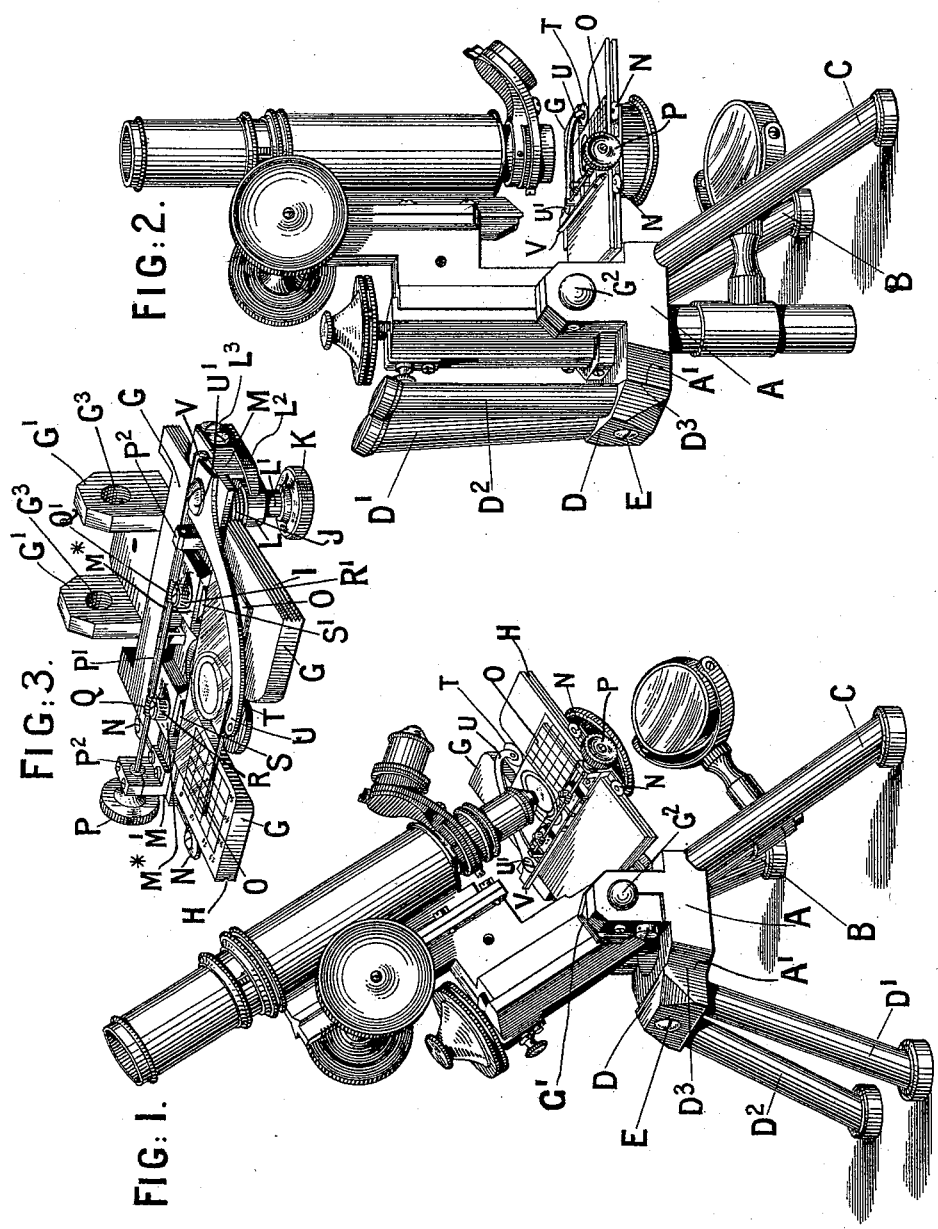

JAMES POWELL SWIFT, OF LONDON, ENGLAND.

MECHANICAL STAGE FOR MICROSCOPES.

SPECIFICATION forming part of Letters Patent No. 536,552, dated March 26, 1895.

Application filed October 1, 1894. Serial No. 524,637. (No model.)

*To all whom it may concern:*

Be it known that I, JAMES POWELL SWIFT, manufacturer of philosophical and scientific instruments, a subject of the Queen of Great Britain, residing at 81 Tottenham Court Road, London, England, have invented a Mechanical Stage for Microscopes, of which the following is a specification.

This invention relates to a novel form of stand or support and a new mechanical stage for microscopes—that part of my present invention relating to the stand having for its object that when such stand is placed on an unlevel or uneven surface it will adapt itself thereto as well as giving increased steadiness to the microscope on level surfaces by reason of my improved construction of such stands and furthermore is designed to permit the legs to be folded or swung round in such a manner as to afford compactness for placing the microscope in its box or case while that part of my present invention relating to the stage is designed to produce a novel form of stage and slide thereon which will fulfill all the requirements of ordinary use on a microscope and which can be made and fitted to many existing forms of microscope at a comparatively low cost the details of all of which will be fully described hereinafter and finally pointed out in the claims.

Referring to the drawings hereunto annexed: Figure 1 is a side view in elevation of a microscope set up ready for use having my present improvements applied thereto. Fig. 2 shows same with the pivoted double legs (hereinafter described) folded or swung round and the microscope ready for placing in its box or case. Fig. 3 is a perspective view of my new mechanical stage removed from the microscrope.

*Description of the stand.*—A is the table or support carrying the instrument.

B C are two independent legs rigidly formed on or fixed to the table A as shown or same may be mounted to the table A in any other suitable manner as desired.

D' D² are the two legs rigidly fixed to the crossbar D or D D' D² may be formed all in one casting or otherwise suitably constructed—as desired—to move only as one piece.

The edge A' of the table A is beveled off as shown and also the inner face D³ of the part D is correspondingly beveled where it lies against said part A'.

E is a screw (or a headed pin or other suitable axis may be used) to suitably secure the forked legs and crossbar D D' D² to the table A. Thus the legs D' D² can be swung round on the pivot E from the position shown in Fig. 1 to the position shown in Fig. 2—the line of travel thereof (on account of the beveled meeting faces A' D³) being in a diagonal direction or otherwise than at right angles to the horizontal plane of the table A.

*Description of the stage.*—G is the platform of the stage having the lugs G' G' formed thereon by which same is mounted to the body of the microscope by the pivots G² passing through the holes G³ in said lugs G' as usual—or in any other suitable or convenient manner.

H is a V-shaped groove on one side of the platform while the other side of the said platform has a series of grooves I in which latter operates a friction wheel J mounted in a spring bearing and having a series of grooves thereon corresponding to I.

K is a milled head rigidly fixed on the same shaft or axis as J by which means the latter is rotated—this shaft being journaled in a suitable bearing L and sleeve L' on same this bearing being pivotally connected to and carried on the slide M—the spring L² mounted at L³ to the slide M normally keeping the bearing L and friction wheel J pressed toward the edge of the platform G. The opposite end M' of this slide M carries oppositely extending arms in which are journaled the two beveledged wheels N which latter travel in the aforesaid V-shaped groove H and by reason of the distance apart of said two wheels N thereby impart great steadiness and accuracy in the longitudinal movement of said slide M when the same is caused to travel upon the platform G by rotation of the milled head K.

The transverse movement is imparted to the glass slide or object glass O in the following manner:

P is a milled head fixed on the shaft P' journaled in the bearing blocks P² and having two endless screws or worms Q Q' thereon. The latter gear with the worm wheels R R' which are fixed to the axis of and thereby rotate the friction wheels S S'. These rollers S S' are advantageously beveled, that is to say, of a less circumference at the bottom edge than the top edge thereof so as to thus prevent the glass slide O from rising off the stage G. The wheels R S and R' S' respectively are journaled in bearings formed for same on the slide M as shown by throwing up portions M<sup>x</sup> of the said slide M for this purpose.

T is an "idle" pressure roller (the edge of which may be beveled same as the driven rollers S S' or otherwise suitably formed as desired) pivoted to the arm U which latter is pivoted at U' to the said slide M suitable spring pressure being applied to this arm U so as to normally force same and the roller T thereon toward the aforesaid friction rollers S S', for instance by a suitable flat spring such as V fixed on the back of the slide M. See Figs. 1 and 2.

The operation of this stage is as follows:—
To place the glass slide O in position the spring arm U is pressed back by the end so as to permit said slide O to be placed in position between the idle pressure roller T and the friction rollers S S' and upon release of the said arm U the spring pressure will firmly press said slide O against the said friction rollers S S' so that when the latter are rotated thereby the glass slide O will be very slowly and very accurately moved transversely across the face of the platform G while the rotation of the milled head K as already described will cause the slide M and with it the glass slide O to be accurately moved longitudinally on said platform G. If desired the milled head P can be placed on the other end of the shaft P' which would be extended for this purpose (or such shaft may have a milled head P at each end thereof) so that the operator can with one hand readily cause either the longitudinal or transverse motion desired to be imparted to the object glass O.

Having thus described my invention, what I claim as new, and desire to secure by Letters Patent of the United States, is—

1. The combination, in the stage of a microscope, of a platform provided with a groove along one edge thereof; a slide adapted to travel upon the said platform; guide rollers carried by said slide and running in said groove; means for holding said guide rollers in said groove, and means for causing said slide to move along said platform in the direction of said groove, substantially as and for the purposes described.

2. The combination, in the stage of a microscope, of a platform provided with a groove along one edge thereof; a slide adapted to travel upon the said platform; guide rollers carried by said slide and adapted to run in said groove; a friction roller carried by said slide at the side opposite to said guide rollers, for causing said slide to move along said platform, in the direction of said groove, substantially as and for the purposes described.

3. The combination, in the stage of a microscope, of a platform provided with a groove along one edge thereof; a slide adapted to travel upon said platform; guide rollers carried by one end of said slide and adapted to run in said groove; a shaft carried by the opposite end of said slide; a spring-pressed friction roller fixed on said shaft, and means for rotating said shaft to cause said friction roller to rotate along the edge of said platform and thus cause said slide to move along the surface of the platform in the direction of said groove, substantially as and for the purposes described.

4. The combination in the stage of a microscope, of a platform provided with a groove along one edge thereof, and a plurality of grooves along the opposite edge thereof; a slide adapted to travel on said platform; a pair of guide rollers carried by said slide and adapted to run in said groove; a grooved friction roller adapted to be rotated along said grooves, also carried by said slide; a spring for pressing said friction roller into said grooves; and means for rotating the said friction roller, and causing said slide to move along said platform in the direction of said grooves, substantially as described.

5. The combination in the stage of a microscope, of a platform provided with a groove along one edge thereof, and a plurality of grooves along the opposite edge thereof; a slide adapted to travel on said platform; an object glass on said platform adapted to be moved by said slide; a pair of guide rollers carried by said slide and adapted to run in said groove, a grooved friction roller adapted to be rotated along said grooves, also carried by said slide; a spring for pressing said friction roller into said grooves; means for rotating the said friction roller, and causing said slide to move along said platform in the direction of said grooves; and means carried by said slide for causing said object glass to move across said platform at right angles to the line of travel of said slide, substantially as described.

6. The combination, in the stage of a microscope, of a platform provided with a groove along one edge thereof, and a plurality of grooves along the opposite edge thereof; a slide resting upon and adapted to travel on said platform in the direction of said grooves; an object glass on said platform adapted to be moved by said slide; a pair of guide rollers carried by said slide and adapted to run in said groove; a grooved friction roller adapted to be rotated along said grooves, also carried by said slide; means for pressing said friction roller into said grooves; means for rotating said friction roller by hand and thus causing said slide to move along said platform in the direction of said grooves, and a shaft mounted in bearings in said slide and connected by means of a worm gear to a pair of friction rollers carried by said slide; means for rotating said shaft, and thus causing said object glass to move across said platform in a direction at right angles to the line of travel of said slide, substantially as and for the purposes described.

7. The combination, in the stage of a microscope, of a platform provided with a groove along one edge thereof, and a plurality of grooves along the opposite edge thereof; a slide resting upon and adapted to travel on said platform in the direction of said grooves; an object glass on said platform adapted to be moved by said slide; a pair of guide rollers carried by said slide and adapted to run in said groove; a grooved friction roller adapted to be rotated along said grooves, also carried by said slide; means for rotating said friction roller by hand and thus causing said slide to move said object glass along said platform in the direction of said grooves, a shaft mounted in bearings in said slide and connected by means of a worm gear to a pair of friction rollers carried by said slide; means for rotating said shaft, and thus causing said object glass to move across said platform in a direction at right angles to the line of travel of said slide, and means for holding the edge of said object glass against said friction rollers, substantially as and for the purposes described.

8. The combination, in the stage of a microscope, of a platform provided with a groove along one edge thereof, and a plurality of grooves along the opposite edge thereof; a slide resting upon and adapted to travel on said platform in the direction of said grooves; an object glass on said platform adapted to be moved by said slide; a pair of guide rollers carried by said slide and adapted to run in said groove; a grooved friction roller adapted to be rotated along said grooves, also carried by said slide; means for pressing said friction roller into said grooves; means for rotating said friction roller by hand and thus causing said slide to move along said platform in the direction of said grooves, and a shaft mounted in bearings in said slide and connected by means of a worm gear to a plurality of friction rollers carried by said slide, an arm carried by said slide; a roller carried by the free end of said arm, and a spring adapted to normally press said arm inward and cause said wheel to bear against one edge of said object glass and thus cause the opposite edge of said object glass to bear against said friction rollers; and means for rotating said shaft and thus causing said object glass to move across said platform in a direction at right angles to the line of travel of said slide, substantially as and for the purposes described.

9. The combination, in the stage of a microscope, of a platform provided with a groove along one edge thereof; a slide adapted to travel upon said platform; in the direction of said groove; an object glass resting upon said platform and adapted to be moved along said platform by said slide; means for moving said slide along said platform in the direction of said groove; and means carried by said slide for causing said object glass to move independently of said slide, across said platform in a direction at right angles to the line of motion of said slide, substantially as and for the purposes described.

JAMES POWELL SWIFT.

Witnesses:
HENRY BIRKBECK,
34 *Southampton Buildings London, England,*
*Chartered Patent Agent.*
GEORGE WILLIAM KEY,
*Clerk to the above.*